US007590885B2

(12) United States Patent
Kondo et al.

(10) Patent No.: US 7,590,885 B2
(45) Date of Patent: Sep. 15, 2009

(54) METHOD AND SYSTEM OF COPYING MEMORY FROM A SOURCE PROCESSOR TO A TARGET PROCESSOR BY DUPLICATING MEMORY WRITES

(75) Inventors: Thomas J. Kondo, Santa Clara, CA (US); Robert L Jardine, Cupertino, CA (US); William F. Bruckert, Los Gatos, CA (US); David J. Garcia, Los Gatos, CA (US); James S. Klecka, Georgetown, TX (US); James R. Smullen, Carmel, CA (US); Jeff Sprouse, Mountain View, CA (US); Graham B. Stott, Dublin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 578 days.

(21) Appl. No.: 11/114,319

(22) Filed: Apr. 26, 2005

(65) Prior Publication Data

US 2006/0242456 A1 Oct. 26, 2006

(51) Int. Cl.
*G06F 11/00* (2006.01)
(52) U.S. Cl. ........................................ 714/13
(58) Field of Classification Search ................ 714/3, 714/12, 13, 11
See application file for complete search history.

(56) References Cited

U.S. PATENT DOCUMENTS

| | | | |
|---|---|---|---|
| 4,256,926 A * | 3/1981 | Pitroda et al. ............... | 379/269 |
| 4,371,754 A * | 2/1983 | De et al. ..................... | 714/10 |
| 5,295,258 A * | 3/1994 | Jewett et al. ................ | 714/12 |
| 5,384,906 A | 1/1995 | Horst | |
| 5,504,861 A * | 4/1996 | Crockett et al. ............. | 714/13 |
| 5,600,784 A | 2/1997 | Bissett et al. | |
| 5,615,403 A | 3/1997 | Bissett et al. | |
| 5,737,514 A * | 4/1998 | Stiffler ........................ | 714/13 |
| 5,745,672 A * | 4/1998 | Stiffler ........................ | 714/6 |
| 5,751,955 A * | 5/1998 | Sonnier et al. .............. | 714/12 |
| 5,787,243 A * | 7/1998 | Stiffler ........................ | 714/13 |
| 5,790,397 A | 8/1998 | Bissett et al. | |
| 5,884,018 A | 3/1999 | Jardine et al. | |
| 5,884,019 A * | 3/1999 | Inaho .......................... | 714/6 |
| 5,890,003 A * | 3/1999 | Cutts et al. .................. | 710/263 |
| 5,896,523 A | 4/1999 | Bissett et al. | |
| 5,956,474 A | 9/1999 | Bissett et al. | |
| 5,991,518 A | 11/1999 | Jardine et al. | |
| 6,038,685 A | 3/2000 | Bissett et al. | |
| 6,073,251 A * | 6/2000 | Jewett et al. ................ | 714/7 |

(Continued)

OTHER PUBLICATIONS

Microsoft Computer Dictionary, Fifth Edition (2002), p. 133.*

*Primary Examiner*—Robert Beausoliel
*Assistant Examiner*—Amine Riad (57) ABSTRACT

A method and system of copying memory from a source processor to a target processor by duplicating memory writes. At least some of the exemplary embodiments may be a method comprising stopping execution of a user program on a target processor (the target processor coupled to a first memory), continuing to execute a duplicate copy of the user program on a source processor (the source processor coupled to a second memory and generating writes to the second memory), duplicating memory writes of the source processor and duplicating writes by input/output adapters to create a stream of duplicate memory writes, and applying the duplicated memory writes to the first memory.

14 Claims, 4 Drawing Sheets

U.S. PATENT DOCUMENTS

| | | | |
|---|---|---|---|
| 6,141,770 A * | 10/2000 | Fuchs et al. | 714/11 |
| 6,263,452 B1 * | 7/2001 | Jewett et al. | 714/9 |
| 6,279,119 B1 | 8/2001 | Bissett et al. | |
| 6,327,668 B1 | 12/2001 | Williams | |
| 6,363,493 B1 * | 3/2002 | Williams | 714/1 |
| 6,389,554 B1 * | 5/2002 | Jung et al. | 714/6 |
| 6,393,582 B1 * | 5/2002 | Klecka et al. | 714/11 |
| 6,473,869 B2 * | 10/2002 | Bissett et al. | 714/12 |
| 6,604,177 B1 * | 8/2003 | Kondo et al. | 711/150 |
| 6,671,823 B1 * | 12/2003 | McClelland et al. | 714/13 |
| 6,757,811 B1 * | 6/2004 | Mukherjee | 712/220 |
| 6,910,150 B2 * | 6/2005 | Mashayekhi et al. | 714/4 |
| 6,928,583 B2 * | 8/2005 | Griffin et al. | 714/11 |
| 6,941,396 B1 * | 9/2005 | Thorpe et al. | 710/74 |
| 6,948,092 B2 * | 9/2005 | Kondo et al. | 714/12 |
| 7,058,853 B1 * | 6/2006 | Kavanappillil et al. | 714/13 |
| 7,107,484 B2 * | 9/2006 | Yamazaki et al. | 714/12 |
| 7,225,355 B2 * | 5/2007 | Yamazaki et al. | 714/12 |
| 7,231,469 B2 * | 6/2007 | Hosoya et al. | 710/22 |
| 7,251,743 B2 * | 7/2007 | Chen et al. | 714/6 |
| 7,363,431 B1 * | 4/2008 | Niver et al. | 711/141 |
| 7,426,656 B2 * | 9/2008 | Bernick et al. | 714/12 |
| 2001/0056554 A1 * | 12/2001 | Chrabaszcz | 714/13 |
| 2002/0133740 A1 * | 9/2002 | Oldfield et al. | 714/6 |
| 2002/0144177 A1 * | 10/2002 | Kondo et al. | 714/13 |
| 2002/0152420 A1 | 10/2002 | Chaudhry et al. | |
| 2003/0131281 A1 * | 7/2003 | Jung et al. | 714/13 |
| 2003/0191910 A1 * | 10/2003 | Matsunami et al. | 711/154 |
| 2004/0006722 A1 | 1/2004 | Safford | |
| 2004/0153691 A1 * | 8/2004 | Fujimoto et al. | 714/3 |
| 2004/0153749 A1 * | 8/2004 | Schwarm et al. | 714/11 |
| 2005/0102557 A1 * | 5/2005 | Davies et al. | 714/11 |
| 2005/0182864 A1 * | 8/2005 | Hosoya et al. | 710/22 |
| 2005/0193245 A1 * | 9/2005 | Hayden et al. | 714/13 |
| 2005/0204096 A1 * | 9/2005 | Shimada | 711/113 |
| 2005/0240564 A1 * | 10/2005 | Mashayekhi et al. | 707/1 |
| 2005/0240806 A1 * | 10/2005 | Bruckert et al. | 714/6 |
| 2005/0283543 A1 * | 12/2005 | Hawkins et al. | 710/15 |
| 2006/0253549 A1 * | 11/2006 | Arakawa et al. | 709/217 |

* cited by examiner

METHOD AND SYSTEM OF COPYING MEMORY FROM A SOURCE PROCESSOR TO A TARGET PROCESSOR BY DUPLICATING MEMORY WRITES

BACKGROUND

In order to implement fault tolerance, some computing systems execute duplicate copies of a user program on multiple processors in a lock-step fashion. In a dual-modular redundant system, two processors are used, and in a tri-modular redundant system, three processors are used. Outputs of the duplicate copies of the user program are compared or voted, and in the event the outputs match, they are consolidated and sent to other portions of the computing system. If the outputs do not match, the processor experiencing a computational or hardware fault is voted out and logically (though not necessarily physically) removed from the system.

In order for the logically removed processor to resume lock-stepped execution of the duplicate copy of the user program, the memory of the failed processor needs to be copied from one of the remaining processors. One mechanism to perform the memory copy is to stop execution of user programs on the processor or processors in the system that did not experience a fault, and copy the entire memory of one of the processors to the memory of the failed processor. However, the amount of memory to be copied may be in the gigabyte range or greater, and thus the amount of time the entire computer system is unavailable may be significant. A second method to copy memory is to cyclically pause the user programs of the non-failed processors, and copy a small portion of the memory from a non-failed processor to the memory of the failed processor. Eventually, all the memory locations will be copied, but inasmuch as the user programs are operational intermittently with the copying, memory locations previously copied may change. Thus, such a system may need to track memory accesses of a user program to portions of the memory that have already been copied to the memory of the failed processor, and at some point all the non-failed processors stopped and all the memory locations changed by user programs after the memory copy process copied to the memory of the non-failed processor. In practice, however, this last step of copying memory locations changed by the user programs may involve a significant number of memory locations, and thus the amount of time that the user programs are unavailable because of this copying may be excessive.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
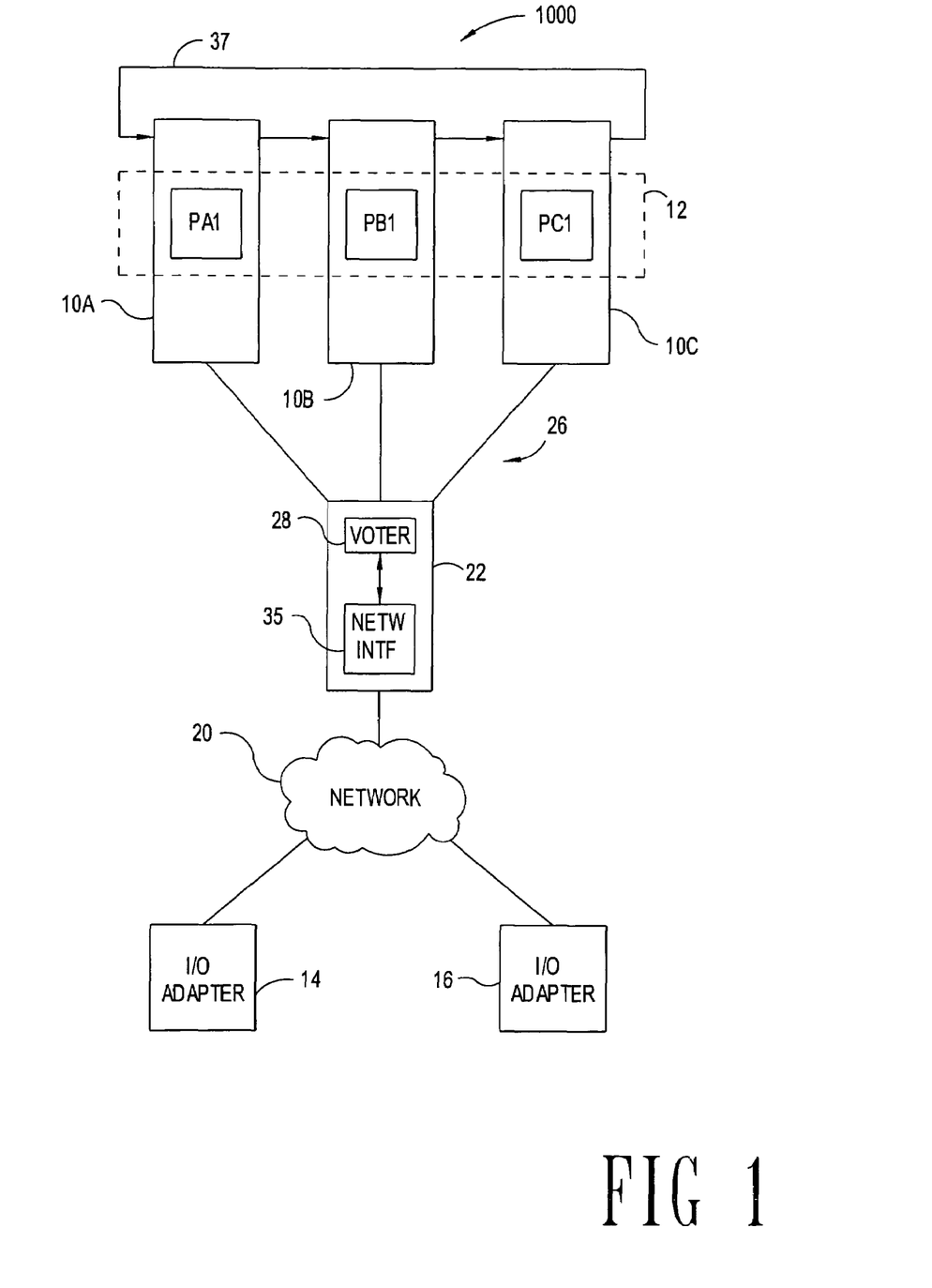
FIG. 1 illustrates a computing system in accordance with embodiments of the invention.

FIG. 1 illustrates the computing system 1000 in accordance with embodiments of the invention. In particular, the computing system 1000 comprises a plurality of computer systems 10. In some embodiments, only two computer systems 10 are used and as such the computing system 1000 may implement a dual-modular redundant (DMR) system. As illustrated in FIG. 1, the computing system 1000 comprises three computer systems 10, and therefore implements a tri-modular redundant (TMR) system. Regardless of whether the computer system is dual-modular redundant or tri-modular redundant, the computing system 1000 implements fault tolerance by redundantly executing user programs across the computer systems.

In accordance with embodiments of the invention, a processor of each computer system 10 is logically grouped to form a logical processor 12. In accordance with embodiments of the invention, each processor within a logical processor substantially simultaneously executes the duplicate copies of a user program, thus implementing fault tolerance. More particularly, each processor within a logical processor is provided the same instruction stream for the user program and computes the same results (assuming no errors). In some embodiments, the processors within a logical processor are in cycle-by-cycle lock-step. In alternative embodiments, the processors are loosely lock-stepped. In some embodiments, the processors have non-deterministic execution, and thus cycle-by-cycle lock-step may not be possible. In the event one of the processors has a computational or hardware fault, the one or more remaining processors continue without affecting overall system performance.

Inasmuch as there may be two or more processors within a logical processor executing the same user programs, duplicate reads and writes are generated, such as reads and writes to input/output (I/O) adapters 14 and 16 coupled to the synchronization logic 22 by way of a network 20. The I/O adapters 14 and 16 may be any suitable I/O adapters, e.g., a network interface or a hard disk drive. In order to compare outputs for purposes of fault detection, the logical processor 12 has associated therewith a synchronization logic 22. Thus, each computer system 10 couples to the synchronization logic 22 by way of an interconnect 26. The interconnect 26 may be a Peripheral Component Interconnected (PCI) bus, and in particular a serialized PCI bus, although other bus or network communication schemes may be equivalently used.

The synchronization logic 22 comprises a voter logic unit 28. The voter logic 28 acts to consolidate outputs such as read and write requests from the processors, and plays a role in the exchange of information between processors, possibly for coordinating memory copying. Consider for purposes of explanation each processor in logical processor 12 executing its copy of a user program, and that each processor generates a read request to network interface (NETW INTF) 34. Each processor of logical processor 12 sends its read request to the voter logic 28. The voter logic 28 receives each read request, compares the read requests, and (assuming the read requests agree) issues a single read request to the network interface 35.

In response to the single read request issued by a synchronization logic, the illustrative network interface 35 returns the requested information to the voter logic 28. In turn, the voter logic replicates and passes the requested information to each of the processors of the logical processor. Likewise for other input/output functions, such as writes and transfer of packet messages to other programs (possibly executing on other logical processors), the synchronization logic ensures that the requests match, and then forwards a single request to the appropriate location. In the event one of the processors in the logical processor 12 does not function properly (e.g., fails to generate a request, fails to generate a request within a specified time, generates a non-matching request, or fails completely), the offending processor is voted out and the overall user program continues based on requests of the remaining processor or processors of the logical processor.

Figure 2:
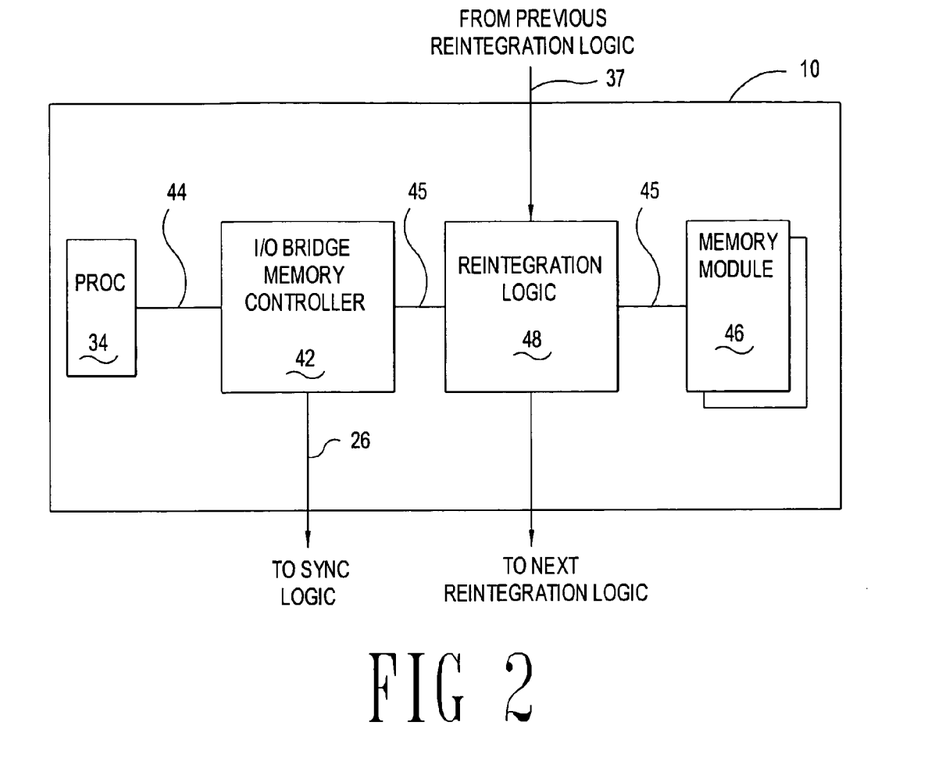
FIG. 2 illustrates in greater detail a computer system in accordance with embodiments of the invention.

FIG. 2 illustrates in greater detail a computer system 10. In particular, FIG. 2 illustrates that a computer system 10 in accordance with embodiments of the invention may have at least one processor 34. The processor couples to an I/O bridge and memory controller 42 (hereinafter I/O bridge 42) by way of a processor bus 44. The I/O bridge 42 couples the processor 34 to one or more memory modules 46 by way of a memory bus 45. Thus, the I/O bridge 42 controls reads and writes to the memory area defined by the one or more memory modules 46. The I/O bridge 42 also allows the processors 34 to couple to the synchronization logic (not shown in FIG. 2), as illustrated by bus line 26. FIG. 2 also shows that each computer system 10 comprises a reintegration logic 48 coupled between the I/O bridge 42 and the memory modules 46. The illustrative embodiments of FIG. 1 show the interconnections of the reintegration logics (line 37) in the form of a ring, but any network topology may be equivalently used. At times when a processor does not need to be reintegrated, the reintegration logic 48 is transparent to the I/O bridge 42, and does not interfere with reads and writes to the one or more memory modules 46. However, in the event that one processor within a logical processor experiences a fault and is voted out, or for some other reason needs to be reintegrated, the reintegration logic 48, in combination with other reintegration logics, enables copying of memory from source processors, so that the target processor can begin at the same execution point as the source processors in the logical processor.

Figure 3:
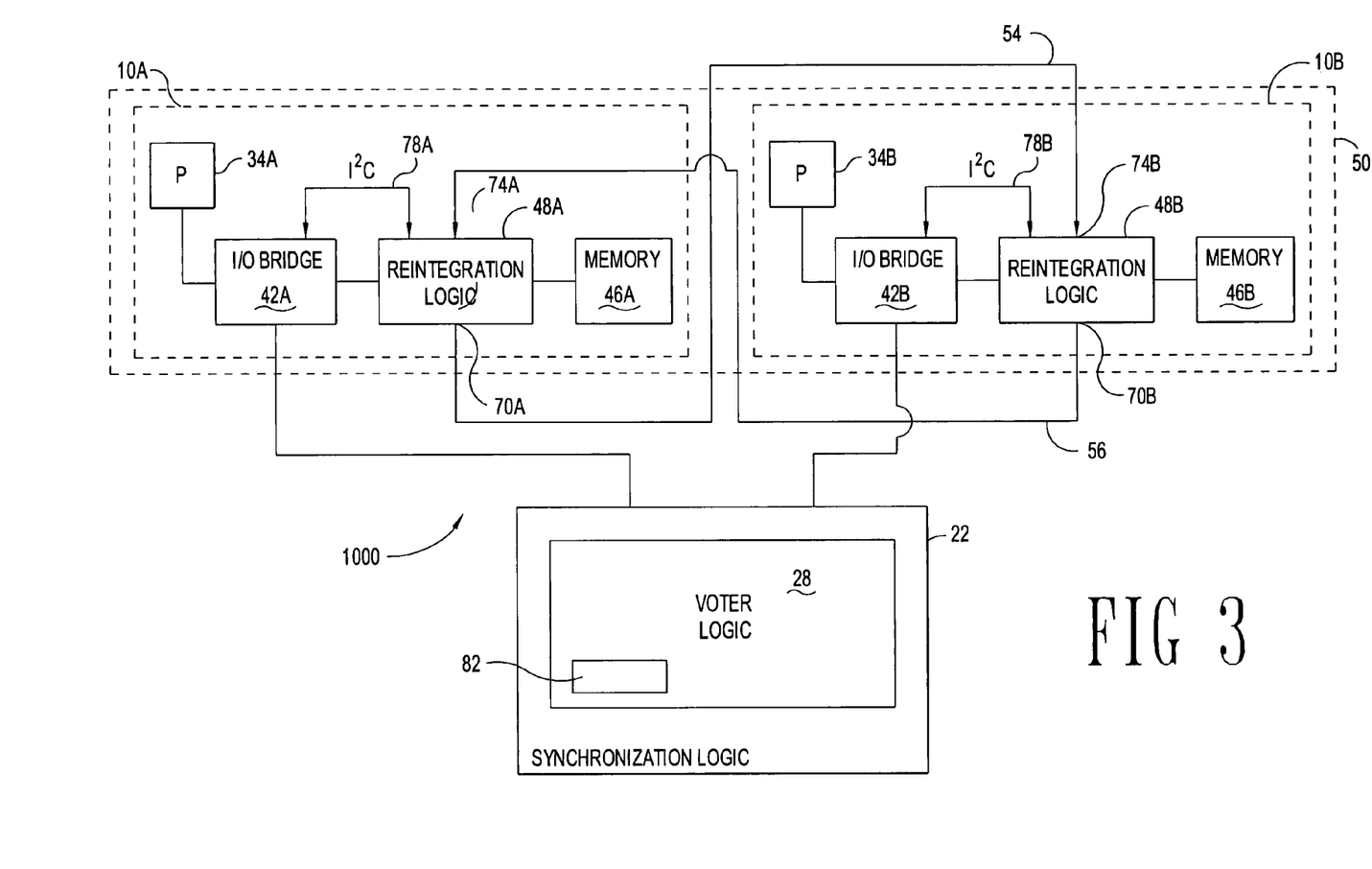
FIG. 3 illustrates interconnection of computer systems in accordance with embodiments of the invention.

FIG. 3 illustrates a partial computing system 1000 in order to describe operation of the various components that work together to reintegrate a failed processor. FIG. 3 is a simplified version of FIG. 1 in the sense that the logical processor 50 in this case comprises only two processors. FIG. 3 is also, in another sense, more detailed than FIG. 1 inasmuch as FIG. 3 illustrates how reintegration logics couple together in a dual-modular redundant system. The logical processor 50 of FIG. 3 comprises one processor from each of the computer systems 10A and 10B. Processor 34A couples to I/O bridge 42A, which in turn couples to both the synchronization logic 22 and memory 46A. Processor 34B couples to its respective I/O bridge 42B, which in turn couples to the synchronization logic 22 and memory 46B. Further, each computer system 10 comprises a reintegration logic 48 coupled between the respective I/O bridge 42 and memory 46. Reintegration logic 48A has an output communications port 70A that couples to an input communications port 74B of reintegration logic 48B, for example by way of communication link 54. Likewise, reintegration logic 48B has an output communication port 70B that couples to an input communication port 74A of reintegration logic 48A, for example by communication link 56. Although only two computer systems 10 are illustrated in FIG. 3, if additional computer systems are present, the respective I/O bridges would likewise couple to the synchronization logic 22, and their respective reintegration logics would couple in series with, or some other configuration, the reintegration logics 48. Only two computer systems are shown in FIG. 3 so as not to unduly complicate the figure.

Figure 4:
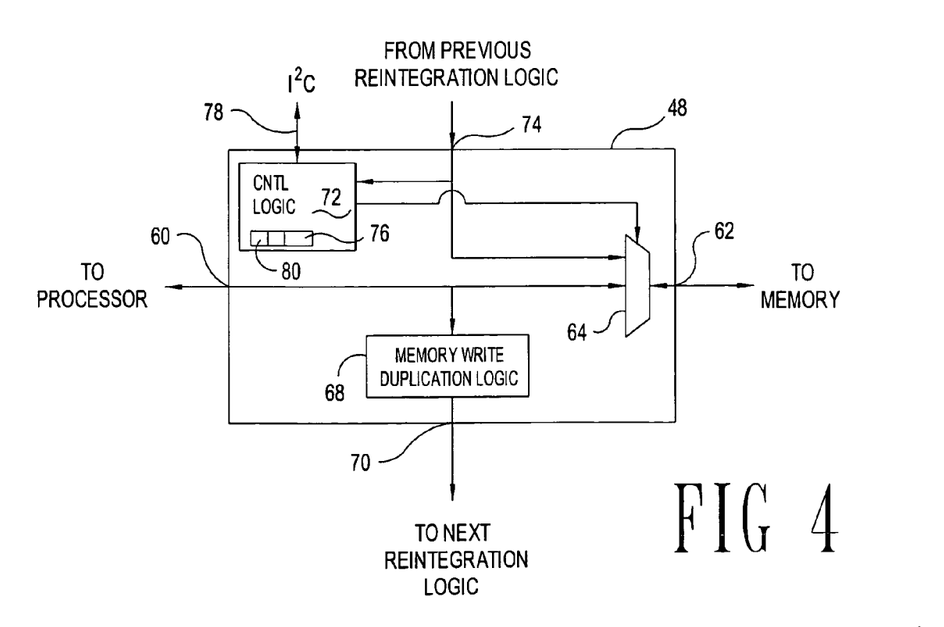
FIG. 4 illustrates a reintegration logic in accordance with embodiments of the invention.

FIG. 4 illustrates in greater detail a reintegration logic 48 in accordance with embodiments of the invention. The functionality implemented within the reintegration logic 48 may take many forms. In some embodiments, each reintegration logic 48 is an application specific integrated circuit (ASIC). In alternative embodiments, each reintegration logic 48 comprises a microprocessor or microcontroller, and related hardware, where the functionality illustrated in FIG. 4 is implemented by way of software routines. Reintegration logic 48 comprises a communication port 60 that couples to one or more processors, possibly through an I/O bridge 42. Likewise, reintegration logic 48 comprises another communication port 62 that couples to memory, such as memory 46. During periods of time when no reintegration is taking place, the switch logic 64 couples communication port 60 to communication port 62. In this configuration, the reintegration logic 48 is transparent to memory reads and writes between a locally connected processor and memory.

Still referring to FIG. 4, the reintegration logic 48 in accordance with embodiments of the invention further comprises a memory write duplication logic 68. The memory write duplication logic monitors memory transactions of the locally connected processor and/or I/O adapters with the memory, duplicates memory writes, and sends the stream of duplicated memory writes to other reintegration logics by way of output communication port 70. While in some embodiments the duplicated writes may be sent relatively unchanged, in alternative embodiments each memory write is wrapped with a cyclic redundancy check code, and the integrity of communication between reintegration logics 48 is tested by the receiving reintegration logic. Thus, the illustrative reintegration logic 48 also comprises a control logic (CNTL LOGIC) 72 that couples to the input communication port 74 carrying the stream of duplicated memory writes from another reintegration logic. In embodiments where the duplicated memory writes are wrapped in a cyclic redundancy check code, control logic 72 performs a cyclic redundancy check on each received message, and keeps a running count of the errors encountered, such as in register 76.

Control logic 72 also couples to the switch logic 64 and selectively commands the switch logic to allow the memory transactions from the locally coupled processor to flow back and forth to the memory, or allow the memory writes of the stream of duplicate memory writes presented on input communication port 74 to flow to the memory. Control logic 72 commands the switch logic 64 at the behest of its locally coupled processor, such as by communications through an I²C bus 78. An I²C bus is a dual line, multi-drop serial bus developed by Phillips Semiconductor® that comprises a clock line and one data line. The devices connected to an I²C bus connect as either primary or secondary devices, and each device is software addressable by a unique address. Primary devices can operate as transmitters, receivers, or combination transmitter/receivers to initiate 8-bit data transfers between devices on the bus. The I²C bus utilizes collision detection and arbitration to prevent data corruption if two or more primaries simultaneously transfer data. Details regarding the I²C bus may found in "The I²C Bus Specification," version 2.1 (January 2000), authored by Phillips Semiconductor®.

Still referring to FIG. 4, the reintegration logic's locally coupled processor 34 commands the reintegration logic to switch from applying memory transactions transparently to applying the stream of duplicate memory writes from an upstream reintegration logic by writing one or more registers 80 within the control logic 72 across the I²C bus 78. Likewise, when copying of memory for purposes of reintegration is complete, the attached processor writes a different value to the register 80, which the control logic 72 recognizes as a command to switch the position of the switch logic 64.

Returning again to FIG. 3, processors within a logical processor, though within different computer systems 10, communicate by way of the synchronization logic 22. In particular, the voter logic 28 of each synchronization logic 22 comprises a plurality of registers 82. These registers 82 may be written and/or read by each processor within a logical processor 50. Thus, processors within a logical processor 50 exchange messages regarding a reintegration by writing and/or reading data from the registers 82 of the voter logic 28. Additionally, the illustrative processors 34A and 34B may generate interrupts to each other through the synchronization logic 22, which could facilitate message exchange through the registers 82, e.g., an interrupt may signal to the receiving processor that data is available in the register 82.

Consider for purposes of explanation that the system illustrated in FIG. 3 is operational with each of the processors executing duplicate copies of a user program in a cycle-by-cycle or loosely lock-stepped fashion. Further consider that processor 34B experiences a computational fault, and the voter logic 28 takes processor 34B out of service. In order to bring processor 34B back into operation, it is necessary to reintegrate processor 34B by copying memory from a non-failed processor, such as processor 34A. Referring to the illustrative flow diagram of FIG. 5, the process of reintegration starts (block 500) by a failed processor (hereinafter the target processor), needing to be reintegrated into fault tolerant operation. Thus, the first step is for the target processor to quiesce (block 504), meaning that the target processor operates only low-level system programs, and runs those low-level system programs only from the cache of the processor (thus leaving memory untouched). Alternatively, the processors could operate from external memory (other than the main memory), such as external cache or external flash memory.

As discussed with respect to FIG. 4, each reintegration logic 48 comprises a control logic 72 that monitors incoming stream of duplicate writes for communication errors, and accumulates those errors in a register. The next step is for the target processor to read the accumulated errors (block 508) such as by communication with its attached reintegration logic over the I²C bus 78. It is noted that while the I²C bus is illustrated in FIG. 3 to couple between the I/O bridge 42 and the reintegration logic 48, the I²C bus may emanate from any component within each computer system 10, such as a bridge device (not specifically shown). If the number of accumulated errors is greater than a predetermined threshold (block 512), this is indicative of communications problems between the reintegration logics. If the accumulated errors are too high, the target processor generates an alarm to the user (block 516) indicating a reintegration fault because of a communication error, and the process ends (block 576). In accordance with at least some embodiments of the invention, the accumulated errors are checked and reset periodically (e.g., every 24 hours) in the absence of reintegration. The number of accumulated errors that result in no attempt to reintegrate may vary from system to system, and in accordance with some embodiments if more than two or three errors have been accumulated, then reintegration should not be attempted.

Figure 5:
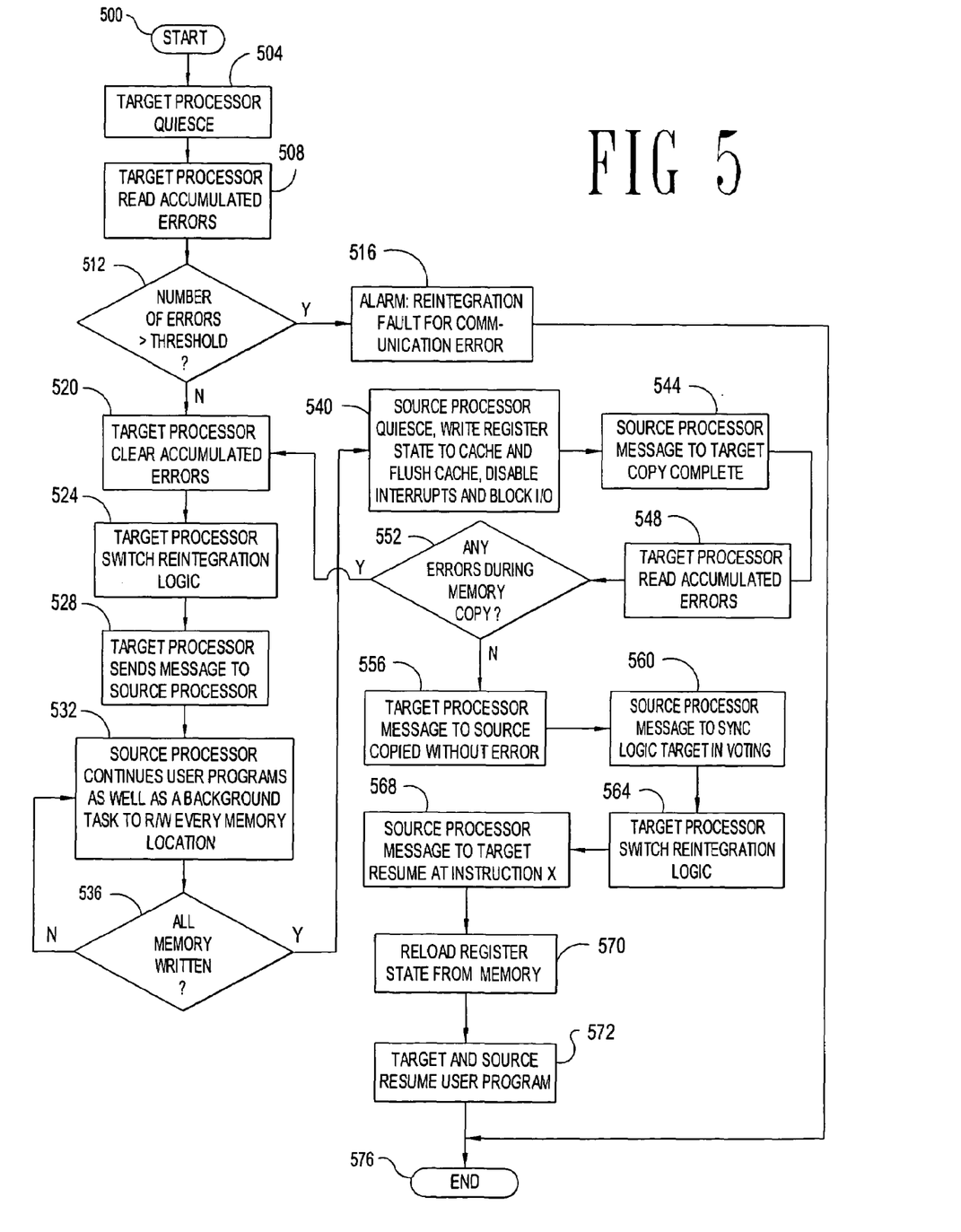
FIG. 5 illustrates a method in accordance with embodiments of the invention.

Still referring to FIG. 5, if the number of errors is less than a predetermined threshold, the next step is for the target processor to clear the accumulated errors (block 520). This illustrative step may be accomplished by the processor communicating with the reintegration logic 48 over the I²C bus 78, and in particular commanding the control logic 72 to clear the register holding the accumulated error. After clearing the accumulated errors from the register, the target processor commands the reintegration logic 48 to switch the switch logic 64 (block 524) to couple the stream of duplicate writes provided at input communications port 74 to the memory through the output communications port 62. Thereafter, the target processor sends a message to the source processor (block 528, through registers 82 in the voter logic 28) that reintegration can begin. The source processor, seeing the message from the target processor, continues executing user programs, and also schedules a task to atomically read and write every memory location of the source processor's memory (block 532). The source processor continues to run its user program and task reading and writing each memory location of the source processor's memory until all the memory is written at least once (block 536). The intent of reading and writing each memory location is to force a cache fill and then, without modifying the data, force a cache write-back for all memory locations. This ensures that all data is written to the memory system and is in turn written to the remote memory by way of the reintegration logic.

Referring again specifically to FIG. 3, in the illustrative situation where processor 34B experiences a fault and has been voted out, processor 34B may thus set itself up for a memory copy, and therefore ultimately reintegration, by commanding its reintegration logic 48B to apply the stream of duplicate memory writes passed to the input communication port 74B to the memory 46B. Processor 34A, by contrast, continues executing the user programs, and also executes the task whose function is to atomically read and subsequently-write every memory location in memory 46A. That is, the task gains ownership of the memory location to the exclusion of all processes wishing to write the location, reads the value, writes the value back, releases ownership and moves to the next memory location. The reintegration logic 48A (and in particular the memory write duplication logic 68 shown in FIG. 4) duplicates memory writes (both by the local processor as well as direct memory accesses by I/O adapters), and places those memory writes on the output communication port 70A. Thus, each write by processor 34A to its memory 46A also results in a duplicate write to memory 46B. By having the task read and subsequently write every location in the memory 46A, every memory location in the memory 46B is likewise written. Although user programs may be also writing values substantially simultaneously, these writes too are duplicated, and while some memory locations may be written multiple times, the end result is that the memory as between the two processors will be the same when the task completes its read and subsequent write of every memory location.

Referring again to FIG. 5, the next step is for the source processor to quiesce, write its register state to memory, flush its cache (including the memory states), disable interrupts, and in some embodiments block I/O (block 540). By the source processor flushing its cache, and blocking direct memory access (DMA) to the memory by I/O adapters, the last of the possible memory locations where the two memories could differ are therefore written by the source processor and duplicated to the memory of the target processor. Thereafter, the source processor sends a message to the target processor that the memory copy is complete (block 544, again through registers 82 in the voter logic 28). After receiving an indication that the memory copy is complete, the target processor reads the accumulated errors from its locally coupled reintegration logic 48 (block 548). If there were any errors in communication between the reintegration logics during the memory copy (block 552), then the process of copying begins anew by the target processor clearing the accumulated register (block 520). Although not specifically shown, in the event the memory copy fails a predetermined number of times, the attempt to reintegrate the failed processor may be abandoned and an alarm sent to the user. If there are no errors during the memory copy (again block 552), the target processor sends a message to the source processor that the copy went without error (block 556). Thereafter, the source processor sends a message to the synchronization logic 22 to allow the target processor back in the voting system (block 560). The target processor then switches its reintegration logic so as to apply memory writes of the target processor to the target processor's memory (block 564). Thereafter, the source processor sends a message to the target processor telling the target processor at what execution point to resume execution (block 568). Each processor reloads the register sate from memory (block 570), enables I/O operations, enables interrupts and resumes execution (block 572), and thus the reintegration process ends (block 576).

The advantages of reintegrating a processor in accordance with the embodiments described above are many. For example, the illustrative method and system may be used to reintegrate a processor to create a dual-modular redundant system, and likewise the illustrative method and system may be used to reintegrate a processor to create a tri-modular redundant system. In the case of creating a tri-modular redundant from a dual-modular redundant system, the two processors of the dual-modular redundant system operate in lock-step, yet only one of the processors is designated as the source processor and provides its stream of duplicated memory writes to the target processor. Moreover, copying memory and reintegrating as described above, the period of time in which user programs are non-responsive (known as the "black hole" time) is significantly reduced. In particular, the "black hole" time is the period of time that it takes the system to write the data from the flushed cache, and exchanging a message to instruct the target processor at what instruction to resume execution. In various embodiments of the invention, the "black hole" time is less than a network 20 timeout, and preferably is less than 10 milliseconds. In some embodiments of the invention this black hole time may be one millisecond or less. Other advantages of a computing system as described is that in the reintegration process, the source processor (whose memory writes are duplicated and which runs the background task atomically reading and writing every memory location) need not be reset (booted), to bring the two (or three) processors again into lock-step, the advantage following in part from the fact some embodiments do not operate in strict cycle-by-cycle lock step. Stated otherwise, during reintegration the source processor, and therefore programs executed on the source processor, remain operational in spite of the reintegration (and not counting the relatively short "black hole" time). Further, because processors in accordance with embodiments of the invention need not be in cycle-by-cycle lock step, the processors themselves need not be the same brand, type and/or clock speed.

The illustrative process described with respect to FIG. 5 assumes a mere computational fault on the part of the target processor. In some situations, there may be a hardware fault in the failed processor requiring a reset. In these situations, a hardware reset is initiated on the target processor, and thereafter the process of copying memory for purposes of reintegration may be started. The reintegration, however, need not be tied only to correction of faults. Newly added processors (e.g., adding a computer system 10 to an existing dual-modular redundant computing system 1000 to make it tri-modular redundant) also may use the reintegration technique. Moreover, the reintegration technique and devices herein could be used to change the size of the memory partition used by each processor. For example, if operating dual modular redundant, one of the processors could be stopped, the size of the memory partition of the running processor adjusted, and the second processor added back by reintegrating memory. Further still, the reintegration technique and devices described herein could be used to increase the physical memory in an operating computing system. For example, one processor could be removed and additional physical memory added. The processor with expanded memory is then reintegrated into the system (at the same partition size as before). Thereafter, the processor with the smaller physical memory is removed and its memory expanded, while simultaneously adjusting the memory partition size of the operating processor. Finally, the second processor to have its physical memory increased is added back to the system, and by reintegration as described herein brought back to lock-step operation. Similar operations are possible for tri-modular redundant systems.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    stopping execution of a program on a target processor, the target processor coupled to a first memory;
    continuing to execute a duplicate copy of the program on a source processor, the source processor coupled to a second memory and generating writes to the second memory, the writes from the source processor applied to the second memory in a non-voted fashion;
    duplicating memory writes of the source processor and duplicating writes by input/output adapters to create a stream of duplicate memory writes;
    applying the duplicated memory writes to the first memory; and
    continuing to execute a duplicate copy of the program on a non-source processor during the continuing to execute the duplicate copy of the program on the source processor.

2. The method as defined in claim 1 further comprising, after applying the duplicated memory writes:
    stopping executing of the duplicate copy of the programs in the source and non-source processor;
    flushing the cache of the source processor; and
    resuming execution of the program by the source, non-source and target processor at a same execution point.

3. The method as defined in claim 2 further comprising resuming execution in the source processor without resetting the source processor.

4. The method as defined in claim 2 further comprising, prior to resuming, sending an instruction address or location at which to resume execution from the source processor to the target processor.

5. A computing system comprising:
a first processor coupled to a first memory by way of a first reintegration logic, the first processor configured to execute a program;
a second processor coupled to a second memory by way of a second reintegration logic, the first reintegration logic coupled to the second reintegration logic, and the second processor configured to execute the program in lockstep with the first processor;
an input/output (I/O) adapter coupled to the first processor, the I/O adapter configured to make direct memory access writes to the first memory;
the first reintegration logic is configured to duplicate writes to the first memory from the first processor and configured to duplicate writes to the first memory from the I/O adapter, the duplicating creating a first stream of duplicate writes, and the first reintegration logic is configured to send the first stream of duplicate writes to the second reintegration logic; and
the second reintegration logic has a first configuration that sends the first stream of duplicate writes to the second memory and refrains from sending writes from the second processor to the second memory, and the second reintegration logic has a second configuration that sends memory writes from the second processor to the second memory and refrains from sending the first stream of duplicate writes to the second memory.

6. The computing system as defined in claim 5 further comprising:
the second processor is configured to refrain from executing at least some programs when the second reintegration logic sends the first stream of duplicate writes to the second memory; and
the first processor is configured to read and subsequently write substantially every memory location of the first memory when the second reintegration logic sends the first stream of duplicate writes to the second memory.

7. The computing system as defined in claim 5 wherein the second reintegration logic further comprises:
a control logic;
the control logic is configured to check for proper communication between the first and second reintegration logic using the first stream of duplicate writes when the second reintegration logic sends memory writes from the second processor to the second memory.

8. The computer system as defined in claim 5 further comprising:
the second reintegration logic is configured to duplicate writes to the second memory from the second processor to create a second stream of duplicate writes, and the second reintegration logic is configured to send the second stream of duplicate writes to the first reintegration logic;
the first reintegration logic has a first configuration that sends the second stream of duplicate writes to the first memory and refrains from sending writes from the first processor to the first memory, and the first reintegration logic has a second configuration that sends memory writes from the first processor to the first memory and refrains from sending the second stream of duplicate writes to the first memory.

9. The computing system as defined in claim 8 further comprising:
the second processor is configured to refrain from executing at least some programs when the second reintegration logic sends the first stream of duplicate writes to the second memory; and
the first processor is configured to read and subsequently write substantially every memory location of the first memory when the second reintegration logic sends the first stream of duplicate writes to the second memory.

10. The computing system as defined in claim 8 further comprising:
the first processor is configured to refrain from executing at least some programs when the first reintegration logic sends the second stream of duplicate writes to the first memory; and
the second processor is configured to read and subsequently write substantially every memory location of the second memory when the first reintegration logic sends the second stream of duplicate writes to the first memory.

11. The computing system as defined in claim 5 further comprising:
a third processor coupled to a third memory by way of a third reintegration logic, the third processor configured to execute the program in lock step with the first processor;
the second reintegration logic is configured to duplicate writes to the second memory from the second processor to create a second stream of duplicate writes, and the second reintegration logic is configured to send the second stream of duplicate writes to the third reintegration logic; and
the third reintegration logic has a first configuration that sends the second stream of duplicate writes to the third memory and refrains from sending the writes from the third processor to the third memory, and the third reintegration logic has a second configuration that sends memory writes from the third processor to the third memory and refrains from sending the second stream of memory writes to the third memory.

12. A logic device comprising:
a first communication port configured to couple to a processor, the first communication port configured to couple to the processor by way of a memory bus through a memory controller;
a second communication port configured to couple to a memory, the second communication port configured to couple to the memory by way of a memory bus having the same protocol as the memory bus of the first communication port, and the second communication port configured to couple to the memory being random access memory;
a third communication port configured to couple to a first stream of duplicate memory writes generated by another processor;
the logic device is configured to send the first stream of duplicate memory writes from the third communication port to the second communication port, and is configured to transparently pass memory communications between the first and second communication ports; and when the logic device transparently passes memory communications, the logic device is configured to check integrity of communication of the stream of duplicate memory requests on the third communication port.

13. The logic device as defined in claim 12 wherein the logic device is configured to check integrity by verifying cyclic redundancy check codes of communications received on the third communication port.

14. The logic device as defined in claim 12 further comprising a fourth communication port, wherein the logic device is configured to duplicate memory writes in the memory communications between the first and second ports to create a second stream of memory writes, and wherein the logic device is configured to send the second stream of memory writes out the fourth communication port.

* * * * *